(12) United States Patent
McConnell

(10) Patent No.: US 8,359,343 B2
(45) Date of Patent: Jan. 22, 2013

(54) SYSTEM AND METHOD FOR IDENTIFYING THREAT LOCATIONS

(75) Inventor: James T. McConnell, North Richland Hills, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 630 days.

(21) Appl. No.: 11/954,801

(22) Filed: Dec. 12, 2007

(65) Prior Publication Data

US 2009/0157744 A1 Jun. 18, 2009

(51) Int. Cl.
*G06F 7/00* (2006.01)
*G06F 17/30* (2006.01)

(52) U.S. Cl. .......... 707/899; 707/781; 707/821

(58) Field of Classification Search .......... 707/899, 707/827, 694, 821, 758, 781
See application file for complete search history.

(56) References Cited

U.S. PATENT DOCUMENTS

| 4,729,737 | A  | * | 3/1988  | Reagan et al. ............... 434/35 |
| 7,243,008 | B2 | * | 7/2007  | Stockdale et al. ........... 701/3 |
| 7,260,844 | B1 | * | 8/2007  | Tidwell et al. ............... 726/22 |
| 7,418,733 | B2 | * | 8/2008  | Connary et al. .............. 726/25 |
| 2006/0047800 | A1 | * | 3/2006  | Caveney et al. ............ 709/223 |
| 2006/0253907 | A1 | * | 11/2006 | McConnell ................... 726/23 |

OTHER PUBLICATIONS

Frank Dickman, "Identity & Access Management," 2006 iTRACS Corporation, www.itracs.com, pp. 1-10.*
Dickman, "Identity & Access Management," 2005 iTRACS Corporation, www.itracs.com, pp. 1-10.*

* cited by examiner

*Primary Examiner* — Robert Beausoliel, Jr.
*Assistant Examiner* — Hexing Liu

(57) ABSTRACT

A system and method for identifying threat locations including a receiver to receive threat data identifying a threat, one or more processors configured to retrieve location data from one or more databases based on the threat data, and an output to provide floor plan information identifying threat location based on the location data at a display.

15 Claims, 6 Drawing Sheets

SYSTEM AND METHOD FOR IDENTIFYING THREAT LOCATIONS

BACKGROUND INFORMATION

When a threat in a computer or telecommunications systems is discovered, response resources must be directed to a physical location of the equipment associated with the threat. In practice, this requires extensive efforts to correlate existing threat information, router traffic information, and physical location of impacted/suspect devices to dramatically reduce response time. For example, most responses to a threat require manual review of information, such as TCP/IP switch logs, call data records, advanced intelligent network logs, and with subsequent manual drawing of network "maps." In addition, responses to such a threat include trying to mitigate an intrusion in a sequential or business prioritization order while these efforts are being undertaken. As a result, current response schemes do not allow for an organization's response or management team to easily identify the geographical location of the threats and the locations at which resources are most needed. More specifically, current response schemes do not allow timely access to geographical views of the locations of the threats together with information relating to the status or progress of the response to the threats.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Figure 1:
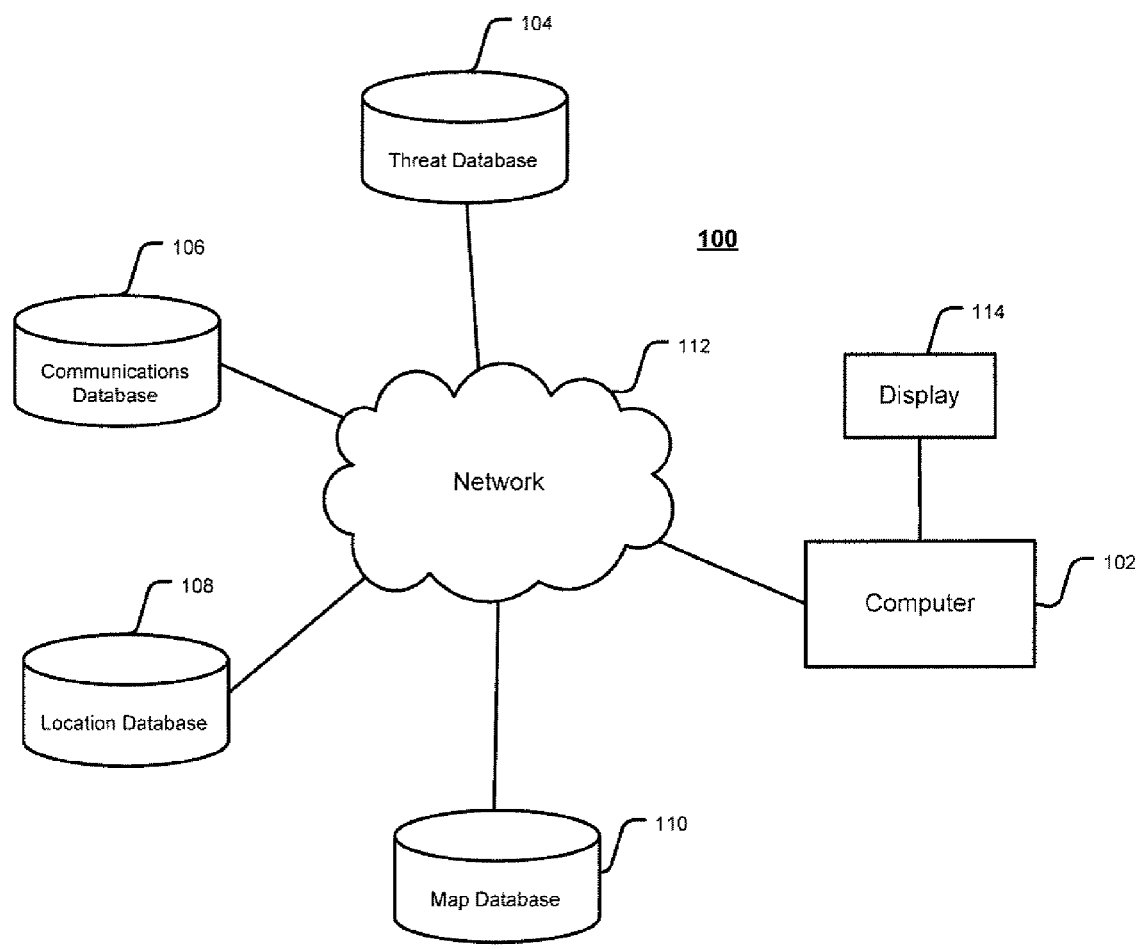
FIG. 1 depicts a block diagram of a system architecture, according to an exemplary embodiment.

Reference will now be made in detail to exemplary embodiments, examples of which are illustrated in the accompanying drawings. Wherever possible, the same reference numbers will be used throughout the drawings to refer to the same or like parts. It should be appreciated that the following detailed description are exemplary and explanatory only and are not restrictive of the invention, as claimed.

Exemplary embodiments may provide a system and method for identifying threat locations. That is, exemplary embodiments may, among other things, expand the techniques for identifying and responding to threats (e.g., cyber attacks, frauds, intrusions, vulnerabilities, etc.) at a network or organization in a manner that is efficient and expedient.

It should be appreciated that the exemplary systems and methods are discussed in terms of mapping "threats." "Threats" may includes "frauds," "intrusions," and "vulnerabilities."

It should be appreciated that as used herein, a "fraud" may refer to an unauthorized use of an electronic network to use deception to obtain a service, good, or other object of value from another in reliance upon the deception.

It should also be appreciated that as used herein, an "intrusion" may refer to an unauthorized use, attempt, or successful entry into a digital, computerized, or automated system, requiring a response from a human administrator or response team to mitigate any damage, or unwanted consequences of the entry. For example, the introduction of a virus and its unauthorized entry into a system by a hacker may constitute "intrusions," according to exemplary embodiments. An "intrusion response" may refer to a response by systems or human operators to limit or mitigate damage from the intrusion or prevent future intrusions. Within the spirit and scope according to exemplary embodiments, "intrusions" of many types and natures may also be contemplated.

It should also be appreciated that as used herein, a "vulnerability" may refer to a prospective intrusion, that is, a location in a digital, computerized, or automated system, at which an unauthorized use, attempt, or successful entry is possible or easier than at other points in the system. For example, a specific weakness may be identified in a particular operating system, such as Microsoft's Windows™ operating system when running less than Service Pack 6. Consequently, all computers running the Windows operating system with less than Service Pack 6 may therefore have this vulnerability. This and other vulnerabilities may be identified by commercially available software products, as well as custom software products. Furthermore, any of the vulnerabilities identified or located by such software products, now known or later developed, may be considered within the scope and spirit according to exemplary embodiments. It should be appreciated that subsequent reference to "intrusions" may include both intrusions and vulnerabilities as described above.

In addition, as used herein, a "mitigation response" may refer to the effort undertaken to reduce unwanted consequences or to eliminate threats. For example, such a response may entail sending a human computer administrator to the site of the location to update software, install anti-virus software, eliminate a virus, or perform other necessary tasks. Additionally, a mitigation response may entail installing a patch to the vulnerable computer or across a network. Other various embodiments may also be provided, such as any mitigation response to a threat requiring the organization of resources.

FIG. 1 depicts a block diagram of a system architecture 100, according to an exemplary embodiment. The system 100 may include a computer 102 (e.g., a mapping computer) and various databases, such as a threat database 104, a communications (or a call/communications detail record (CDR)) database 106, a location database 108, and a map database 110. Each of the various databases may be in electronic communication with the computer 102, e.g., via network 112. The system 100 may also include an output, such as a display 114 (e.g., a video display), for outputting/displaying geographic information correlated and mapped by the computer 102 using the exemplary methods discussed herein. The system 100 may also include a network 112, which may provide electronic communication between system components and may also be a site in which one or more threats may occur.

In one embodiment, the threat database 104 may contain information identifying a threat in the system. For example, the information may include the threat type, description, point of possible entry or exit (e.g., network point or computer), etc. In one embodiment, the threat database 104 may receive data from intrusion detection, content inspection, fraud detection, routers, antivirus, vulnerability, and/or other types of systems (not shown). Threat information may be updated by a computer administrator or other similar updater. In another embodiment, software may be designed and implemented to detect threats at various components of the system 100, such as in a threat detection system (not shown), router (not shown), network management system (not shown), security information manager (not shown), or other system components connected via the network 112. These various systems may communicate from their collection and analysis points to the threat database 104 via network 112 or other similar database communication methods (e.g., object-oriented database connectivity (ODBC), extensible markup language (XML), etc.). Threat information may also include identification information (e.g., network address, machine address, etc.) of various system components where the threat started or ended, Other related information may also be provided by the threat database 104.

The communications database 106 may contain records identifying and/or detailing a plurality of communications (e.g., via POTS (plain old telephone service), cellular, hard-wired broadband, or other wireless network). The plurality of communications may be between system components and/or between system components and external sources via the network 112. The communications database 106 may receive data from telephone switch, fraud detection, billing, and/or other types of systems (not shown). These various systems may communicate from their collection and analysis points to the communications database 106 via network 112 or other similar database communication methods (e.g., ODBC, XML, etc.). Communications information may be sorted by date/time, duration, switch identification, tariff cost, originating and terminating data from threat source (e.g., telephone numbers, network addresses etc.), and/or other similar information. In instances in which the communications database 106 stores information related to communications calls supported by a cellular or other wireless network, the communications information may include wireless location data, such as location data associated with the cellular tower servicing the telecommunications call or GPS (Global Positioning System) data provided by a mobile terminal that originates or receives the telecommunications call. Other communications information may also be supported by the communications database 106

The location database 108 may include geographical information such as the physical address or wireless location, e.g., GPS coordinates or other coordinates of a potential point of entry or exit. The location database 108 may receive data from human input and/or architectural, floor plan, GPS, geocoded data, inventory, building, and/or other types of systems (not shown). These various systems may communicate from their collection points to the map database 108 via network 112 or other similar database communications methods (e.g., ODBC, XML, etc.). The location database 108 may also include switch information for matching network/machine addresses with switch location information, such as switch port, jack number, wireless router identifier, or other similar information.

The map database 110 may correlate and contain information from the threat, communications, and location databases 104, 108, and 110, respectively, to map the threats in a geographical layout. For example, such mapping information may be imported and/or updated by a commercially available mapping sources to visually locate the threat points on a geographical map. These mapping sources may include Google Maps™, GoogleEarth™, or other similar mapping sources. Floor plan information may also be stored at the map database 112. The floor plan information may be provided by architectural designs or blueprints via building management, architects, engineers, or other floor plan sources. In addition to storing the information identified above, the map database 110 may also record and store a status of a threat and provide an indication of the response person or team assigned to respond to the threat.

The computer 102 may include one or more communication mechanisms for communicating information. For example, the computer 102 may have one or more receivers for receiving input signals from one or more external sources. The computer 102 may also have one or more transmitters for transmitting output signals to one or more external sources. Furthermore, the computer 102 may also include one or more processors (not shown) for processing information. The computer 102 may also include a main memory, such as a random access memory (RAM), for storing information and instructions during execution by the one or more processors. In one embodiment, the main memory may be used for storing temporary variables or other intermediate information during execution of instructions to be executed by the one or more processors. The computer 102 may further include a read only memory (ROM), or other storage device, for storing static information and instructions for the one or more processors. For example, a mass storage device, such as a magnetic disk or optical disk, may be provided for storing information and instructions. Other data storage systems may also be provided.

The computer 102 may further be coupled to an input device (not shown) for communicating information and command selections to the one or more processors. The input device may include a keyboard, a mouse, or other similar input device for communicating direction information and command selections to the one or more processors and for controlling cursor movement on the output, e.g., display 114. Cursor movement may have two degrees of freedom in two axes, a first axis (e.g., x) and a second axis (e.g., y), which may allow the device to specify positions in a plane.

According to one embodiment, the computer 102 may execute instructions for geographic mapping of threat information. Either alone or in combination with at least another computer system, the computer 102 may provide geographic mapping of threats in response to the one or more processors executing one or more sequences of instructions contained in RAM, ROM, other data storage system (e.g., computer-readable medium), or a combination thereof. Execution of the sequences of instructions contained may cause the one or more processors to perform functions of mapping computer 102, and/or the process stages described herein. In another embodiment, hard-wired circuitry may be used in place of, or in combination with software instructions, to implement the techniques for threat information mapping. As a result, implementations consistent with the principles according to exemplary embodiments may not be limited to any specific combination of hardware circuitry and software.

It should be appreciated that the term "computer-readable medium" as used herein may refer to any media that participates in providing instructions to the one or more processors for execution. Such a medium may take many forms, including but not limited to, non-volatile media, volatile media, and/or transmission media, Non-volatile media may include, for example, optical or magnetic disks, etc. Volatile media, for example, may include dynamic memory, such as RAM. Transmission media, for example, may include coaxial cables, copper wire and fiber optics, including the wires that form the bus. Transmission media may also take the form of acoustic or light waves, such as those generated during radio wave and infrared data communications.

Common forms of computer-readable media may include, for example, a floppy disk, flexible disk, hard disk, magnetic tape, or any other magnetic medium, CD-ROM, DVD-ROM, or any other optical medium, flash drives, compact flash cards, SD memory, or any other similar medium, punch cards, paper tape, any other physical medium with patterns of holes, RAM, PROM, EPROM, FLASH-EPROM, any other memory chip or cartridge, carrier wave, or any other medium from which a computer may read.

Various forms of computer-readable media may be involved in carrying one or more sequences of one or more instructions to the one or more processors for execution. For example, instructions may initially be carried on the magnetic disk of a remote computer. The remote computer may load the instructions into a dynamic memory and send the instructions over a broadband connection or a telephone line using a modem. In one embodiment, the broadband connection (or telephone line) to the computer 102 may receive the data and use an infrared transmitter to convert the data to an infrared signal. In this example, an infrared detector may receive the data carried in the infrared signal and may carry the data to the main memory, from which the one or more processors may retrieve and execute the instructions. The instructions received by the main memory may optionally be stored on various storage devices either before or after execution by the one or more processors.

The computer 102 may also include a communication interface. The communication interface may provide at least a two-way data communication coupling the network 112. For example, the computer 102 may connect to the network 112 to communicate with at least one server or module in a variety of ways, such as wired or wireless connection. The network 112 may be a local area network (LAN), wide area network (WAN), or any other network configuration. For example, the communication interface may be an integrated services digital network (ISDN) card or a modem to provide a data communication connection. As another example, the communication interface may be a local area network (LAN) card to provide a data communication connection to a compatible LAN. Wireless links may also be implemented. In any such implementation, the communication interface may send and receive electrical, electromagnetic, and/or optical signals that carry digital data streams representing various types of information.

In one embodiment, wired broadband connection may include long-range optical data communications, local area network based protocols, wide area networks, and/or other similar applications. In another embodiment, wireless broadband connection may include long-range wireless radio, local area wireless network such as 802.11 based protocols, wireless wide area network such as WiMax, infrared, Bluetooth™, and/or other similar applications. In one embodiment, the network 112 may include the Internet or World Wide Web. Other networks may also be utilized for connecting each of the various devices, systems and/or servers.

It should be appreciated that the computer 102 may include a desktop computer, a laptop/notebook, a server or server-like system, a module, a telephone, or a communication device, such as a personal digital assistant (PDA), a mobile phone, a smart phone, a gaming controller, a remote controller, or any communication device capable of transmitting or receiving data.

The network 112 may communicate with an Internet Service Provider (ISP). For example, a connection to data equipment operated by the ISP may be provided. The ISP, in turn, may provide data communication services from various servers or hosts to the computer 102. The network may also use electric, electromagnetic, and/or optical signals that carry digital data streams.

The computer 102 may send one or more messages and receive data, including program code, through the network 112 via the communication interface. In this embodiment, an application program may be downloaded to the computer 102 via the network 112 and the communication interface. One such downloaded application may assist the computer 102 to geographically map vulnerability or threat information. Further, the downloaded application (e.g., received code) may be executed by the one or more processors as it is received and/or stored in the various storage devices (e.g., for later execution).

It should be appreciated that the computer 102 may establish connections to multiple servers on the network 112. Such servers may include HTML-based Internet applications to provide information to the computer 102 upon request.

In one embodiment, the output (e.g., display 114) may be directly connected to the computer 102. In another embodiment, display 114 may be connected to the computer 102 via the network 112. For example, the display 114 may be a display connected to another computer on network 112, or may be a stand-alone display device such as a video projector connected to computer 102 via network 112.

In addition, the databases 104, 106, 108, and 110 may each reside within computer 102 (e.g., local) or may reside in any other location (e.g., remote), such as on the network 112, so long as they are in communication with the computer 102.

In one embodiment, the location database 108 may be a static database in which the physical location of routers or network points is located. Such location information may include router (IP/MAC) address and/or a router (or network point) physical address (geographic location), such as GPS coordinates or floor plan layouts. The CDR database 106 and location database 108 may be kept in accordance with any now known or later developed methods for implementing and maintaining call detail records, or physical location information, respectively.

In another embodiment, the databases 104, 106, 108, and 110, may be implemented as a single database, or may be implemented as any number of databases. For example, system 100 may include multiple threat, CDR, location, and map databases. Furthermore, in one embodiment, the databases 104, 106, 108, and 110 may be implemented as a single database containing all of the described information. It should be appreciated that the system 100 may include any number (one or more) of databases so long as the information discussed herein may be retrieved and correlated as discussed herein.

Moreover, the databases 104, 106, 108, and 110 may be implemented using any now known or later developed database schemes or database software. For example, in one embodiment, each of the databases 104, 106, 108, and 110 may be implemented using a relational database scheme, and/or may be built using Microsoft Access™ or Microsoft Excel™ software. While, more likely, the one or more databases may be implemented to take into account other additional factors outside the scope of the exemplary embodiments, any implementation (and location) of these databases may be contemplated and provided.

It should be appreciated that exemplary embodiments may be implemented as a method, a data processing system, or a computer program product. Accordingly, exemplary embodiments may take the form of an entirely hardware embodiment, an entirely software embodiment, or an embodiment combining software and hardware aspects. Furthermore, implementations of the exemplary embodiments may take the form of a computer program product on a computer-readable storage medium having computer-readable program instructions (e.g., computer software) embodied in the storage medium. More specifically, implementations of the exemplary embodiments may take the form of web-implemented computer software. Any suitable computer-readable storage media may be utilized including hard disks, CD-ROMs, optical storage devices, magnetic storage devices, or other similar computer readable/executable storage media.

Figure 2:
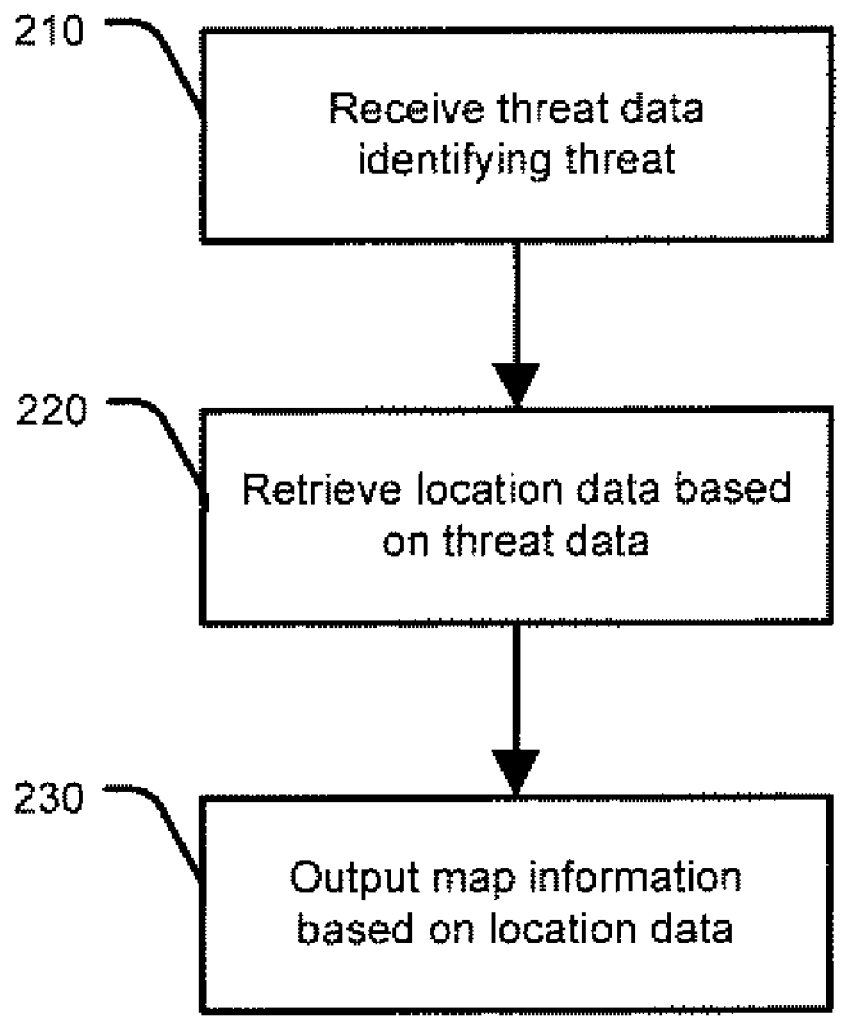
FIG. 2 depicts a flowchart of a method for threat location identification, according to an exemplary embodiment.
Figure 3:
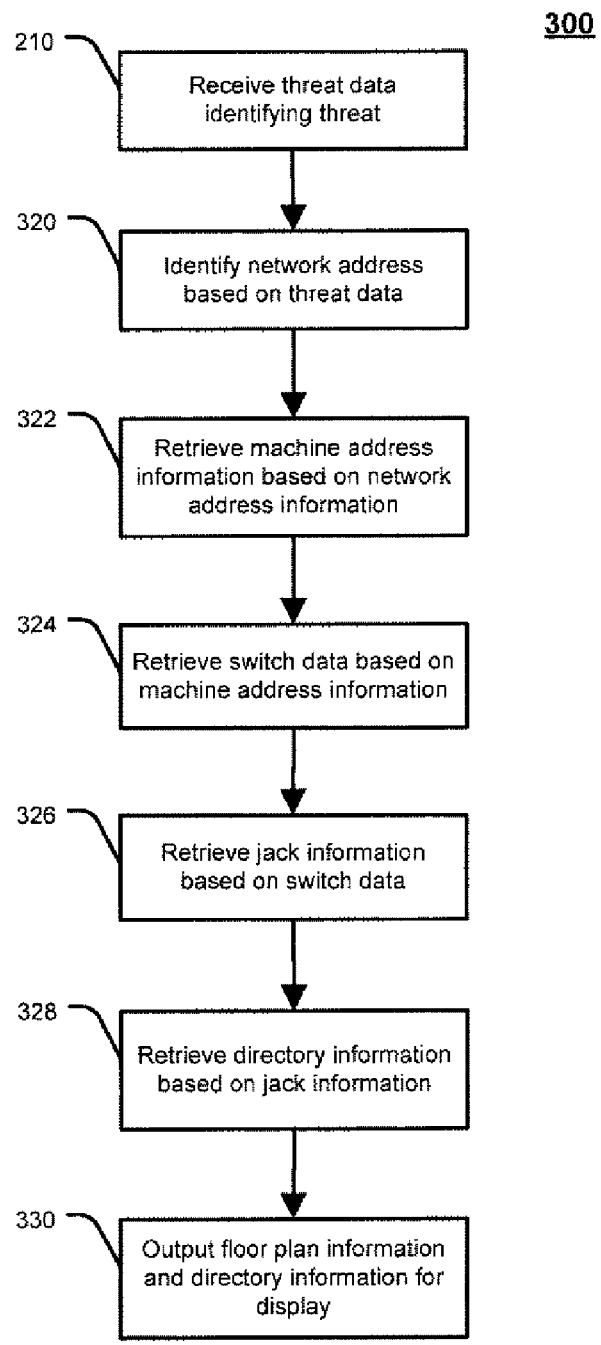
FIG. 3 depicts a flowchart of a method for threat location identification, according to an exemplary embodiment.

FIGS. 2 and 3 depict a flowchart of a method for threat location identification, according to an exemplary embodiment. The exemplary methods 200, 300 are provided by way of example, as there are a variety of ways to carry out methods disclosed herein. The methods 200, 300 shown in FIGS. 2 and 3 may be executed or otherwise performed by one or a combination of various systems. The methods 200, 300 described below are carried out by the system 100 shown in FIG. 1 by way of example, and various elements of the system 100 are referenced in explaining the example methods of FIGS. 2 and 3. Each block shown in FIGS. 2 and 3 represents one or more processes, methods, or subroutines carried in the exemplary methods 200, 300. A computer readable media comprising code to perform the acts of the methods 200, 300 may also be provided. Referring to FIGS. 2 and 3, the exemplary methods 200, 300 may begin at block 210.

At block 210, threat data identifying a threat may be received. For example, a receiver at the computer 102 may receive threat data identifying a threat. In one embodiment, the threat data may include event name information (e.g., a virus name) corresponding to the threat. In another embodiment, as depicted in block 320, the threat data may include network address information corresponding to the identified threat. In this example, the network address may be an IP address or other similar network address.

At block 220, location data from one or more databases based on the threat data may be retrieved. For example, one or more processors of the computer 102 may retrieve, from one or more databases, location data from one or more databases based on the received threat data. In one embodiment, the location data may be represented by GPS location or jack information (e.g., a jack location). In this example, the jack information may correspond to switch data, which in turn may correspond to machine information (e.g., a MAC address or other similar machine address), which in turn corresponds to the network address received at the receiver. Thus, at block 220, retrieving location data may include retrieving machine address information based on the network address (as depicted in block 322), retrieving switch data based on the machine address (as depicted in block 324), and retrieving jack information based on the switch data (as depicted in block 326).

At block 230, map information identifying threat location based on the location data may be provided. For example, such data may be provided to the computer 102 to be outputted at the output, e.g., a display device 114. In this example, the map information at the display 114 may provide map information (e.g., floor plan information) identifying threat location based on the location data, as depicted in block 330. In one embodiment, the map information may include floor plan information associated with the location data, wherein the floor plan information specifies at least one of floor location information, room information, cubicle information, and wireless coverage area information. The map information may be retrieved from one or more databases, e.g., the map database 110. In another embodiment, the map information may include GPS coordinates, which may also overlap the floor plan information.

At block 328, directory information may be retrieved. For example, directory information may be retrieved at one or more data storage systems by the computer 102. In addition, as depicted in block 330, the directory information may be outputted for display by the computer 102 at the output, e.g., the display device 114. The directory information may include at least one of a name of a person who typically occupies the space, an employment title, an image of the person and/or the space, contact information, cubicle, office location, and/or other information relating to the location of the threat and/or floor plan.

Figure 4:
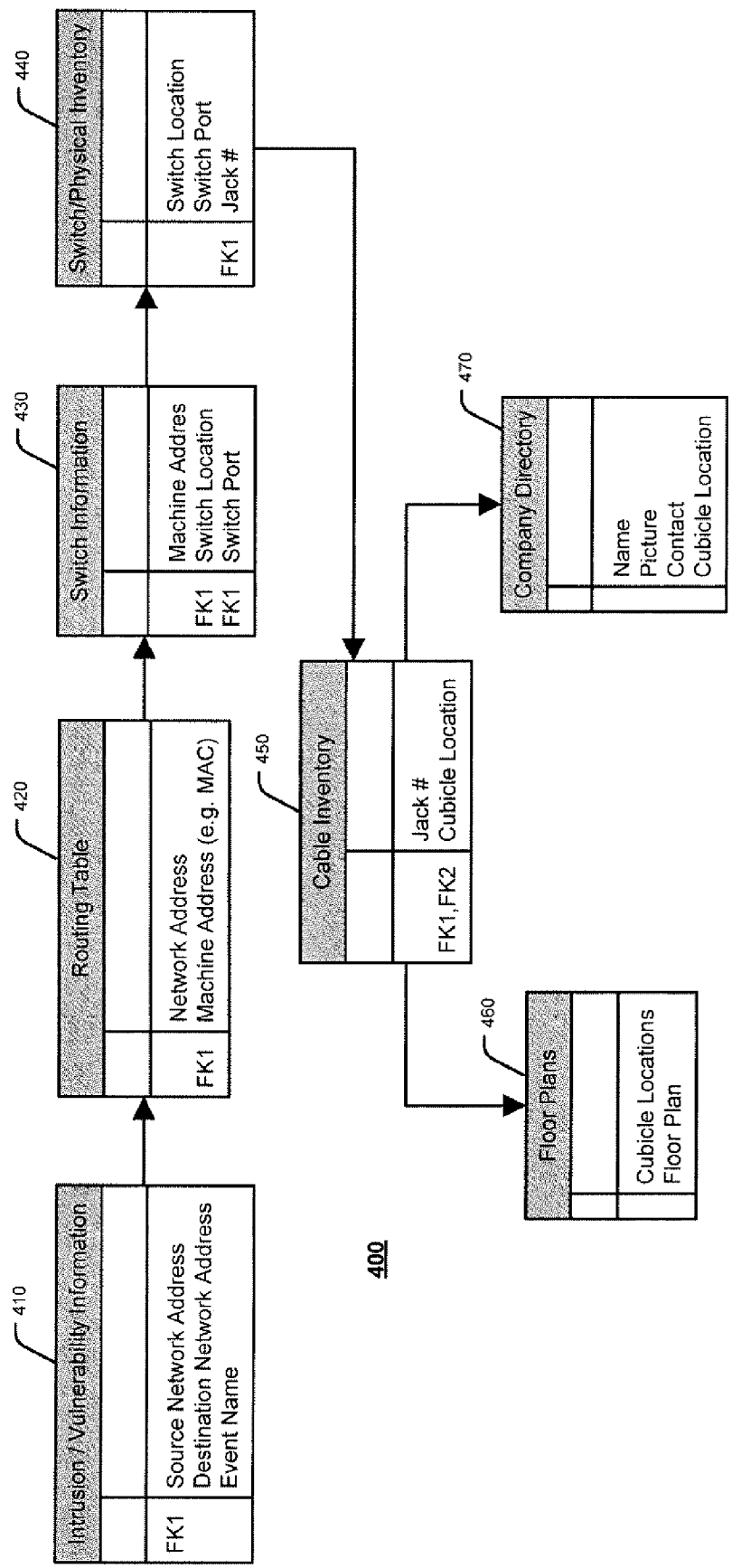
FIG. 4 depicts a data structure relationship illustration for threat location identification, according to an exemplary embodiment.

FIG. 4 depicts a data structure relationship illustration for threat location identification 400, according to an exemplary embodiment. In this example, once a threat is identified, an intrusion/vulnerability information data structure 410 may be provided to correlate various threat data and/or threat related data, such as source network address, destination network address, event name, etc. Once a vulnerable, threatened, or attacked network address information (e.g., network address, IP address, etc.) is identified, a routing table data structure 420 may be provided to correlate the network address information with machine address information (e.g., MAC address or other address identifier). Once machine address information is matched, a switch information data structure 430 may be provided to correlate the machine address information with switch data, such as switch location and/or switch port information. Once the switch location and/or switch port information identified, a switch/physical inventory data structure 440 may be provided to correlate the switch data to jack information, such as a specific jack number where the vulnerability, threat, or attack has been identified. With this information, a cable inventory data structure 450 may then correlate the jack information to a physical location, e.g., a cubicle location. In one embodiment, a floor plans data structure 460 may correlate the cubicle location information with one or more floor plans from one or more data storage systems. In another embodiment, a company directory data structure 470 may correlate the cubicle location information with company directory information, such as a name of a person who typically occupies the space, an employment title, an image of the person and/or the space, contact information, cubicle, office location, and/or other information relating to the location of the threat and/or floor plan. It should be appreciated that while FIG. 4 depicts a geographical threat response based on a cable trace correlation with detailed data structure relationships, other variations and/or embodiments may also be provided.

Figure 5A:
FIGS. 5A-5B depict screenshots of map information for threat location identification, according to an exemplary embodiment.
Figure 5B:
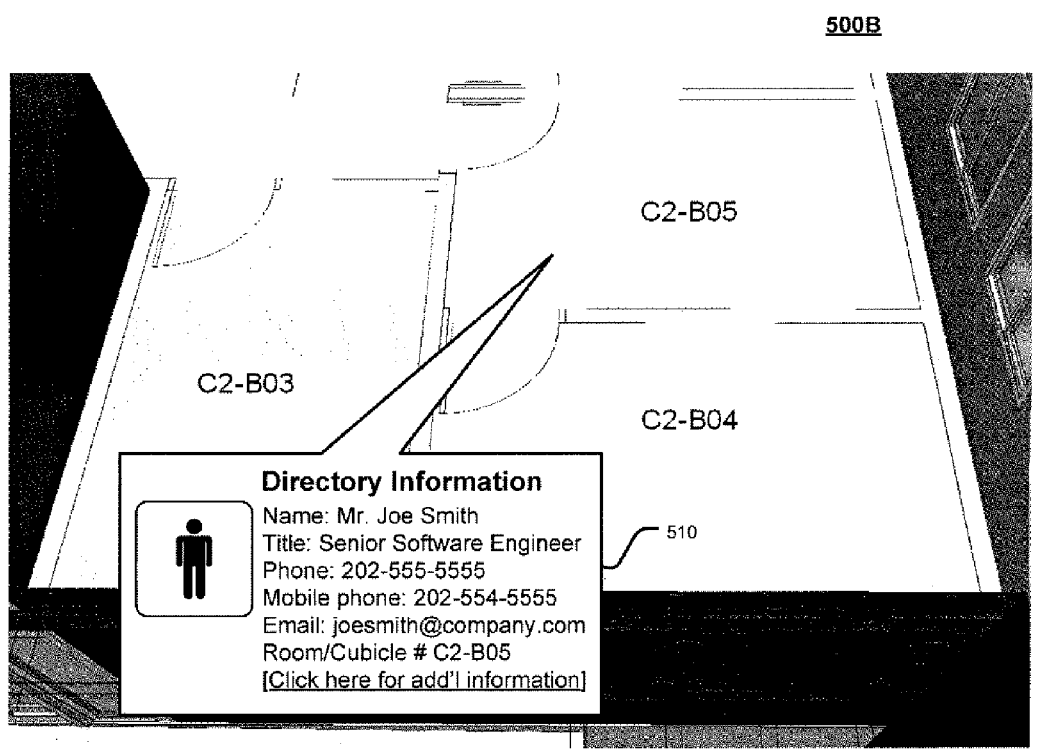

FIGS. 5A-5B depict screenshots of map information for threat location identification, according to exemplary embodiments. For example, in FIG. 5A, the map information may be a geographical view 500A of a building in which a threat is identified. In this example, an icon link (e.g., pushpin) may depict that the threat has been identified in a specific room/cubicle (e.g., C2-B05). In another embodiment, the color of the icon on the map may be used to identify the attributes of threats in an area on the map, allowing the administrators to easily identify problem areas. For example, a red icon may represent a dangerous threat whereas a blue icon may represent a vulnerability. Other various embodiments may also be provided. In addition, the icon link may be linked to additional information. For example, the icon link may be clicked to access additional details of the view 500A, such as a more detailed view of the location of the threat. In another embodiment, the icon link may be linked to information, such as the threat type, network address, status of the response, or other relevant information. Other various techniques for accessing such additional information and/or views may also be provided.

According to another embodiment, in FIG. 5B, the map information may be a zoomed-in floor plan 500B of the room/cubicle in which the threat has been identified. In this example, room/cubicle #C2-B05 may be viewed with greater detail. In another embodiment, directory information 510 may also be provided in conjunction with the floor plan information. For example, the directory information 510 may be overlaid on the screenshot of floor plan. As described above, the directory information 510 may include at least one of a name of a person who typically occupies the space, an employment title, an image of the person and/or the space, contact information, cubicle, office location, and/or additional information relating to the location of the threat and/or floor plan. As a result, once the map information identifying threat location is outputted by the output (e.g., at a display device 114), a floor plan with information relating to the floor, room/cubicle, and employee who normally resides in that work space may be outputted.

This technique not only provides a visual representation of threat identification, but a more efficient and reliable method to map and locate threats within a system. For example, response teams or system administrators may more easily identify a specific location or a specific area or pocket of threats and may therefore be able to better prioritize and more efficiently schedule response personnel to respond and mitigate or eliminate the threat. In addition, by continually updating the map and watching it change over time, system operators may be able to geographically view the spread, if any, of a threat. Furthermore, by also tracking system updates, an administrator may be able to identify new entry points.

Exemplary embodiments may be described above with reference to block diagrams and flowchart illustrations of methods, apparatuses (i.e., systems), and computer program products according to various embodiments. It should be appreciated that each block of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations may support combinations of means for performing the specified functions, combinations of steps for performing the specified functions and program instruction means for performing the specified functions. It should also be appreciated that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In addition to the benefits described above, embodiments of the system and method for threat location identification not only provide an effective and improved technique for providing map information regarding a threat or attack, but also may allow organizations the ability to provide efficient and expedient mitigation response. For example, it should be appreciated that "pushpin" mapping may be provided so that an image of a floor plan may appear for an administrator or operator to identify, via such a pictorial view, in order to provide adequate mitigation response to the identified threat location. Also, the fact that directory information may be also be provided with the floor plan information, additional resources may be provided to assist in mitigating one or more threats. Furthermore, advantages in business and marketing may also be apparent in such a system and method. For instance, providing such a technique for mitigation response may maximize advertisement and marketing opportunities with third party vendors, etch, in addition to regular customers which may not otherwise be provided by conventional threat location techniques.

While the features and functionalities of the providing threat location identification are primarily discussed with respect to the embodiments above, it should be appreciated that the features and functionalities of one embodiment may be similarly applied to other embodiments. For example, while the location identification technique is described primarily in reference to threats at a particular jack location or room/cubicle, it should be appreciated by one skilled in the art that the functions and features of the embodiments of the system and method may apply similarly to a host of other location descriptions as well, where applicable. For instance, in one embodiment, GPS coordinates of the threat location may be provided. In another embodiment, a zone or coverage area (e.g., wireless LAN coverage area) may be provided to identify an area of the threat or intrusion. Other various embodiments may also be provided.

In the preceding specification, various embodiments have been described with reference to the accompanying drawings. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

The invention claimed is:

1. A method, comprising:
receiving threat data identifying a threat;
identifying network address information corresponding to the identified threat;
receiving machine address information based on the network address information;
receiving switch data based on the machine address information;
receiving jack information based on the switch data;
receiving floor plan information and directory information based on the jack information, wherein the floor plan information comprises a visual floor plan, floor location information, room information, cubicle information, and wireless coverage area information and wherein the directory information relates to the physical location of the threat on the floor plan and comprises a name of a person, an employment title, an image of the person, contact information, and cubicle or office location; and outputting the floor plan information and the directory information for display on an interactive map synthesizing the received information such that the floor plan information and the directory information is available on the interactive map through interaction with one or more icons that are a part of the interactive map, wherein the interaction comprises an ability to zoom in on the floor plan information resulting in a pictorial view of the physical location of the threat; and updating the interactive map continuously to reflect updates to the threat information such that the interactive map visually changes in response to the updates.

2. The method of claim 1, wherein receiving threat data comprises identifying event name information corresponding to the threat.

3. The method of claim 1, wherein the network address information is an IP address.

4. The method of claim 1, wherein the machine address information is a MAC address.

5. A non-transitory computer readable medium encoded with computer executable instructions to perform the acts of the method of claim 1.

6. A method, comprising:
receiving threat data identifying a threat;
identifying location data based on the threat data comprising network address information corresponding to the identified threat;
receiving machine address information based on the network address information;
receiving switch data based on the machine address information;
receiving jack information based on the switch data;
receiving directory information based on the location data, wherein the directory information is associated with the location of the threat;
receiving floor plan information based on the location data;
associating the location data with the floor plan information, wherein the floor plan information comprises floor location information, room information, cubicle information, and wireless coverage area information; and
outputting map information and associated directory information identifying threat location based on the location data and directory information, wherein the map information comprises a geographical view of the physical location of the threat and the location data is accessible from the map information through interaction with one or more icons and the one or more icons that are a part of the map information.

7. The method of claim 6, wherein receiving threat data comprises identifying event name information corresponding to the threat.

8. The method of claim 6, wherein the network address information is an IP address.

9. The method of claim 6, wherein the machine address information is a MAC address.

10. The method of claim 6, wherein the directory information comprises at least one of a name of a person, an employment title, an image, contact information, cubicle location, and office location.

11. A non-transitory computer readable medium encoded with computer executable instructions to perform the acts of the method of claim 6.

12. A system, comprising:
a receiver to receive threat data identifying a threat;
one or more processors configured to: receive location data from one or more databases based on the threat data, wherein the location data comprises network address information that comprises machine address information, switch data, and jack information, wherein the jack information corresponds to the switch data, the switch data corresponds to the machine address information, and the machine address information corresponds to the network address, and to receive directory information from one or more databases based on the location data, wherein the directory information is associated with the physical location of the threat and comprises a name of a person, an employment title, an image of the person, contact information, and cubicle or office location; and
an output to provide a display of map information and associated directory information identifying threat location based on the location data and directory information at a display, wherein the map information comprises floor plan information associated with the location data, wherein the floor plan information comprises floor location information, room information, cubicle information, and wireless coverage area information and wherein the map information comprises a geographical view of the physical location of the threat and the location data is accessible from the map information display through interaction with one or more icons that are a part of the map information display and the map information is continuously updated such that the map information visually changes in response to the continuous updates.

13. The system of claim 12, wherein the threat data comprises event name information corresponding to the threat.

14. The system of claim 12, wherein the network address information is an IP address.

15. The system of claim 12, wherein the machine address information is a MAC address.

* * * * *